(12) United States Patent
Han et al.

(10) Patent No.: US 9,823,810 B2
(45) Date of Patent: Nov. 21, 2017

(54) ELECTRONIC SYSTEM WITH INTERFACE MODIFICATION MECHANISM AND METHOD OF OPERATION THEREOF

(71) Applicant: Samsung Electronics Co., Ltd., Suwon-si, Gyeonggi-Do (KR)

(72) Inventors: Kuk Hyun Han, Daejeon (KR); Cathy Kim, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 378 days.

(21) Appl. No.: 14/166,576

(22) Filed: Jan. 28, 2014

(65) Prior Publication Data

US 2014/0325448 A1 Oct. 30, 2014

Related U.S. Application Data

(60) Provisional application No. 61/816,440, filed on Apr. 26, 2013, provisional application No. 61/841,219, filed on Jun. 28, 2013.

(51) Int. Cl.
*G06F 3/048* (2013.01)
*G06F 3/0481* (2013.01)
*G06F 9/44* (2006.01)

(52) U.S. Cl.
CPC ........ *G06F 3/04817* (2013.01); *G06F 9/4443* (2013.01); *G06F 9/4445* (2013.01)

(58) Field of Classification Search
CPC ............... G06F 3/04817; G06F 3/0482; G06F 3/04842; G06F 1/163; G06F 3/011; G06F 3/013; G06F 3/017; G06F 3/0485; G06Q 30/0601; G06Q 30/0641; G06Q 30/0207; G06Q 30/00; G06Q 30/06; G06Q 30/0633; G06Q 30/0643

See application file for complete search history.

(56) References Cited

U.S. PATENT DOCUMENTS

| | | | |
|---|---|---|---|
| 8,260,881 B1 | 9/2012 | Paleja et al. | |
| 8,386,317 B2 | 2/2013 | Brown et al. | |
| 8,412,594 B2 | 4/2013 | Kunda | |
| 8,756,121 B2* | 6/2014 | Gonsalves | G06Q 30/0601 705/26.1 |
| 2004/0110474 A1* | 6/2004 | Yonekura | H04L 29/06 455/74 |
| 2006/0259942 A1 | 11/2006 | Toyama et al. | |
| 2007/0244769 A1* | 10/2007 | Boesel | G06Q 30/06 705/26.1 |
| 2008/0086451 A1* | 4/2008 | Torres | G06F 17/30864 |
| 2008/0246736 A1* | 10/2008 | Han | G06F 3/0488 345/173 |
| 2009/0132349 A1 | 5/2009 | Berkley et al. | |
| 2011/0004651 A1* | 1/2011 | Tuli | G04G 21/08 709/203 |

(Continued)

*Primary Examiner* — Linh K Pham
(74) *Attorney, Agent, or Firm* — IP Investment Law Group

(57) ABSTRACT

An electronic system includes: a control unit, configured to: provide an iconic content; generate a user interface type for the iconic content; generate a device formatted content from the iconic content for conforming with a device capability factor of a presentation device; and a communication unit, coupled to the control unit, configured to deliver the device formatted content for presentation with the user interface type on the presentation device.

20 Claims, 7 Drawing Sheets

(56) References Cited

U.S. PATENT DOCUMENTS

| | | | |
|---|---|---|---|
| 2011/0125569 A1* | 5/2011 | Yoshimura | G06Q 10/10 |
| | | | 705/14.36 |
| 2011/0238536 A1* | 9/2011 | Liu | G06Q 30/02 |
| | | | 705/27.2 |
| 2011/0265003 A1 | 10/2011 | Schubert et al. | |
| 2012/0179542 A1 | 7/2012 | Findlan | |
| 2012/0191577 A1* | 7/2012 | Gonsalves | G06Q 30/0601 |
| | | | 705/27.2 |
| 2012/0327782 A1* | 12/2012 | Tanaka | H04L 43/50 |
| | | | 370/241 |
| 2013/0040623 A1* | 2/2013 | Chun | H04N 21/4126 |
| | | | 455/414.2 |
| 2013/0091263 A1 | 4/2013 | Song et al. | |
| 2013/0103499 A1* | 4/2013 | Sipes | G06Q 30/0241 |
| | | | 705/14.55 |
| 2013/0173415 A1* | 7/2013 | Harvill | G06Q 30/06 |
| | | | 705/26.5 |
| 2013/0252600 A1* | 9/2013 | Seo | G06F 3/01 |
| | | | 455/420 |
| 2014/0040069 A1* | 2/2014 | Tomasofsky | G06Q 30/06 |
| | | | 705/26.8 |
| 2014/0058840 A1* | 2/2014 | Chakrabarty | G06F 3/0481 |
| | | | 705/14.55 |
| 2014/0279242 A1* | 9/2014 | Staicut | G06Q 30/0643 |
| | | | 705/26.61 |

* cited by examiner

ELECTRONIC SYSTEM WITH INTERFACE MODIFICATION MECHANISM AND METHOD OF OPERATION THEREOF

CROSS-REFERENCE TO RELATED APPLICATION(S)

This application claims the benefit of U.S. Provisional Patent Application Ser. No. 61/816,440 filed Apr. 26, 2013 and 61/841,219 filed Jun. 28, 2013, and the subject matter thereof is incorporated herein by reference thereto.

TECHNICAL FIELD

An embodiment of the present invention relates generally to an electronic system, and more particularly to a system for interface modification.

BACKGROUND

Modern consumer and industrial electronics, especially devices such as graphical computing systems, televisions, cellular phones, smart apparel and devices, portable digital assistants, and combination devices, are providing increasing levels of functionality to support modern life including device customization. Research and development in the existing technologies can take a myriad of different directions.

As users become more empowered with the growth of electronic and computing systems, new and old paradigms begin to take advantage of this new device space. One such advancement has been customization of device interfaces and content. However, the rapid growth in consumer electronics and the modification of device interfaces and content for multiple devices have presented new challenges for the users.

Thus, a need still remains for an electronic system with interface modification mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: provide iconic content generate a user interface type for the iconic content; generate a device formatted content from the iconic content for conforming with a device capability factor of a presentation device; and a communication unit, coupled to the control unit, configured to deliver the device formatted content for presentation with the user interface type on the presentation device.

An embodiment of the present invention provides a method of operating an electronic system including: providing an iconic content; generating a user interface type for the iconic content; generating a device formatted content from the iconic content for conforming to a device capability factor of a presentation device; and delivering the device formatted content for presentation with the user interface type on the presentation device.

An embodiment of the present invention provides a non-transitory computer readable medium including instructions for operating an electronic system including: providing an iconic content; generating a user interface type for the iconic content; generating a device formatted content from the iconic content for conforming to a device capability factor of a presentation device; and delivering the device formatted content for presentation with the user interface type on the presentation device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
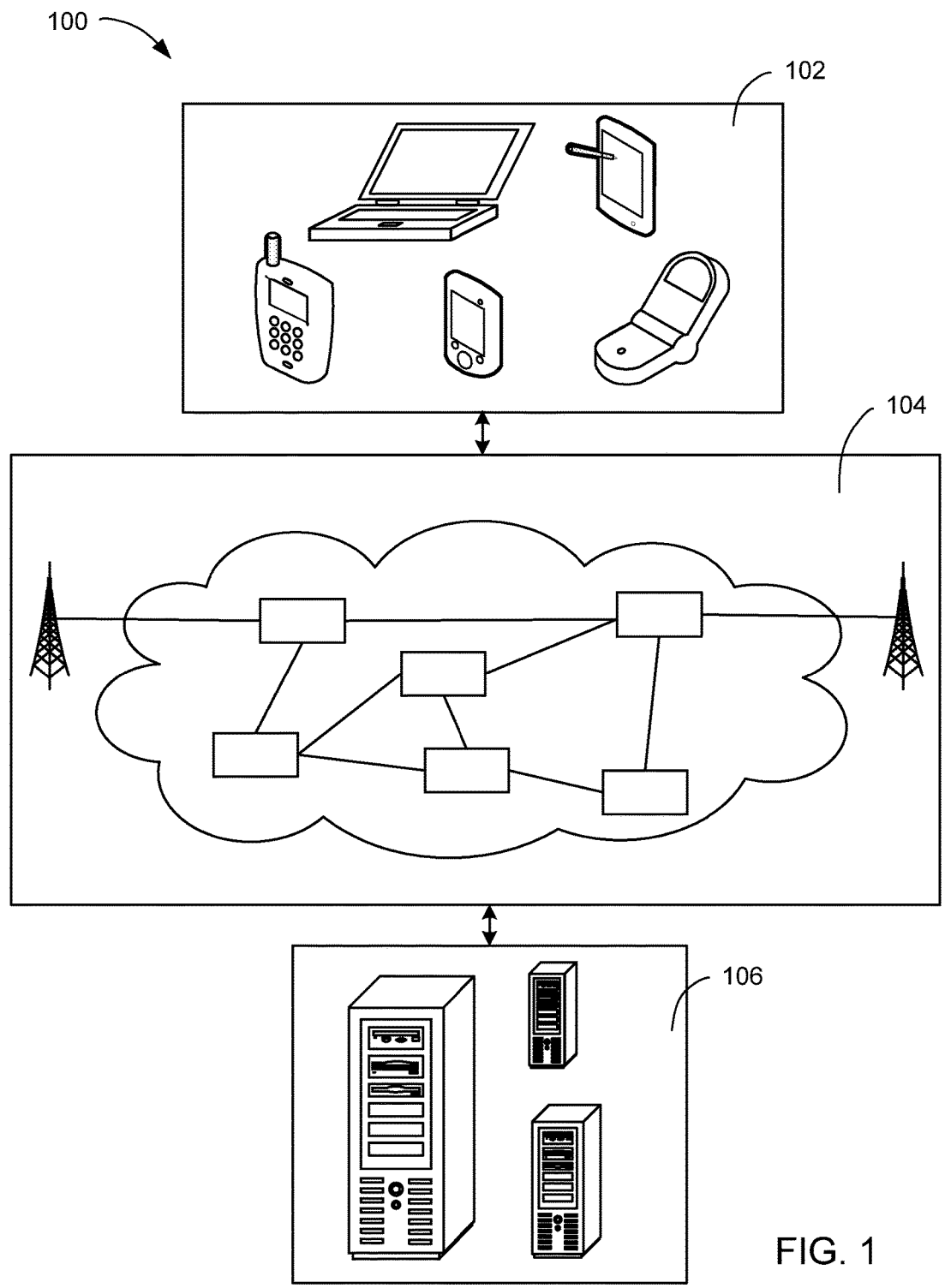
FIG. 1 is an electronic system with interface modification mechanism in an embodiment of the present invention.

An embodiment of the present invention provides improved integration between the presentation device and the associated device for presentation of the device formatted content. The device formatted content can be formatted or modified differently based on the device capability factors of the presentation device and the associated device for complementary presentation of the device formatted content which provides improved integration between the presentation device and the associated device.

A further embodiment of the present invention provides improved presentation of the presentation content, including the iconic content, on the presentation device, the associated device, or a combination thereof by generating the device formatted content. The device formatted content can be generated to conform with or match the device capability factors of the presentation device, the associated device, or a combination thereof to improve presentation of the presentation content.

In yet a further embodiment of the present invention provides improved presentation of the user interface type on the presentation device, the associated device, or a combination thereof by generating the device modified user interface. The device modified user interface can be generated to conform with or match the device capability factors of the presentation device, the associated device, or a combination thereof to improve presentation of the user interface type.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with interface modification mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, smart device, such as a phone, watch, clothing, or jewelry having audio, visual, haptic capabilities, or a combination thereof, a notebook computer, a display system, such as a flexible display or other multi-functional display, or entertainment device. The first device 102 can couple, either directly or indirectly, to the communication path 104 to communicate with the second device 106 or can be a stand-alone device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
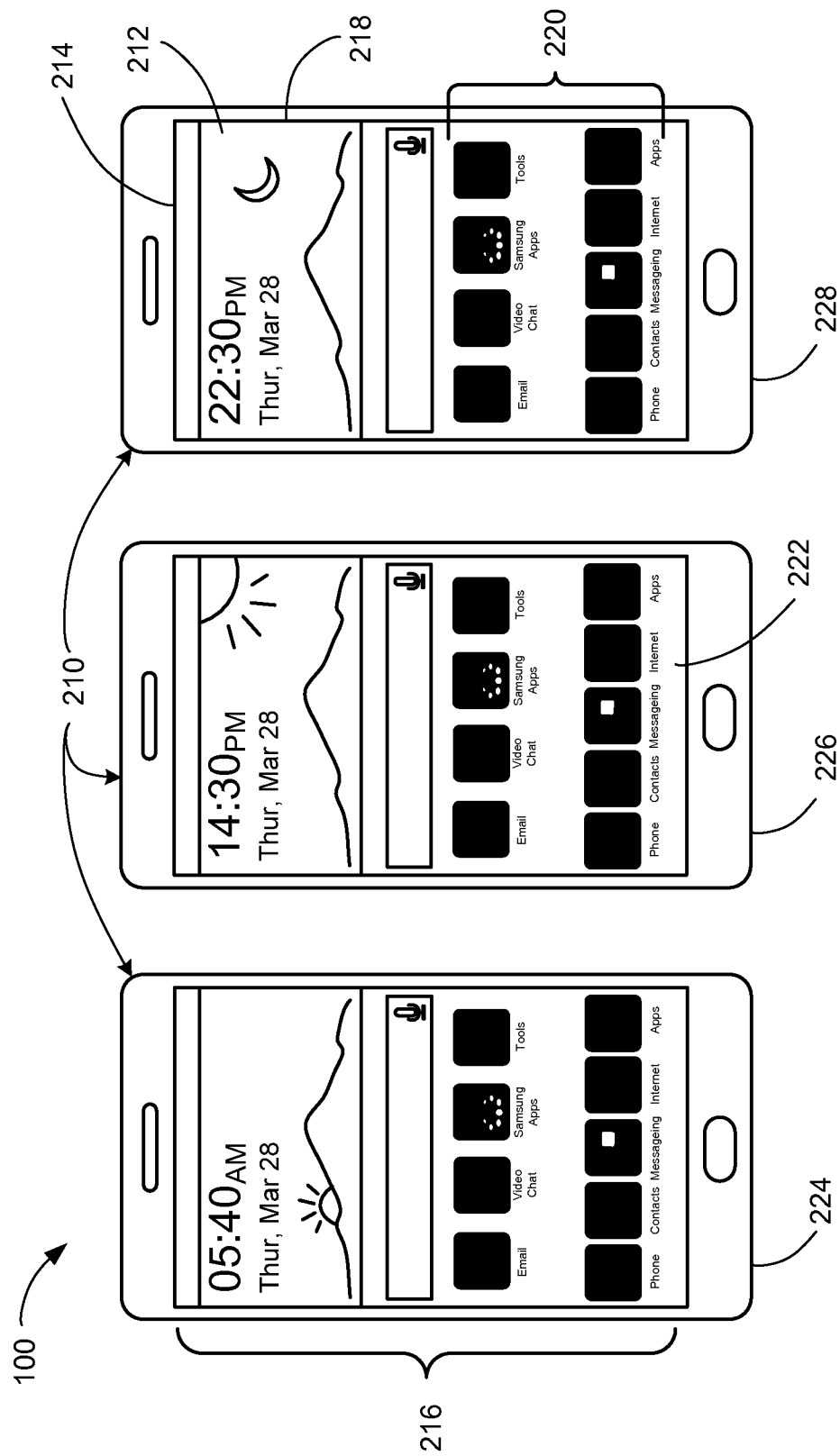
FIG. 2 is an example of a display interface of the first device of FIG. 1.

Referring now to FIG. 2, therein is shown an example of the first device 102 of FIG. 1. The first device 102 can be or can include a presentation device 210. For illustrative purposes, the presentation device 210 can be a mobile phone, although it is understood that the presentation device 210 can be a different type of device. For example, the presentation device 210 can be a smart device, such as a phone, watch, clothing, or jewelry having audio, visual, haptic capabilities, or a combination thereof, a vehicle or vehicle display, a display device, such as a television, flexible display, a computer display, or other devices, such as a tablet computer, a desktop computer, or a laptop computer.

The presentation device 210 can present presentation content 212 on a user interface type 214. The presentation content 212 is content or features that can be customized or modified for presentation on one or more devices. The presentation content 212 can include component content such as visual content, such as images; audio content, such as sounds or music; video content, such as animation and video streams; haptic content, such as changes in temperature, texture, or physical feedback; or a combination thereof. The presentation content 212 can include content from various content sources. For example, the presentation content 212 can be from exclusive, limited access, or limited distribution sources from private institutions including brand name designers, sports organizations, or publishing companies, such as Chanel, National Geographic, or the New York Times, and public institutions or government agencies, such as NASA. In another example, the presentation content 212 can include content from personal sources, such as a personal photo gallery, or unrestricted or publically available sources, such the internet websites. The presentation content 212 will be discussed in greater detail below.

The user interface type 214 is a modifiable interface for presenting content. The user interface type 214 can be an arrangement or integration of components for the presentation of content. For example, the user interface type 214 can be the arrangement of interface components 216 to provide the look, design, layout, integration, or a combination thereof for the presentation content 212. In another example, the user interface type 214 can be modified to match or conform to the form factor of the presentation device 210.

The interface components 216 are the components of the interface that are used to present and integrate content for presentation on the device. For example, the interface components 216 can determine the arrangement and integration of the presentation content 212 on the user interface type 214.

In a specific example, as illustrated in FIG. 2, the user interface type 214 can include the interface components 216 of a top layer 218, a platform layer 220, and a bottom layer 222, although it is understood that the user interface type 214 can include the different number or arrangement of the interface components 216. To continue the example, the top layer 218, can be for displaying live-stream, time lapse images, or video data. The platform layer 220 can, for example, be for presentation of icons. The bottom layer 222 can, for example, be for presenting an image or static background.

As an example, FIG. 2 illustrates the presentation content 212 in a first instance 224, a second instance 226, and a third instance 228 of the interface components 216 of the user interface type 214. In this example, the presentation content 212 depicts a real time video feed of a mountain range in the top layer 218, icons in the platform layer 220, and a blank image in the bottom layer 222 of the interface components 216. The first instance 224 of the interface components 216 shows the sun rising over the horizon of the mountains at 5:40 AM in the morning. The second instance 226 of the interface components 216 shows the mountains during the midday hour of 2:30 pm. The third instance 228 of the interface components 216 shows the mountains with the moon overhead at 10:30 pm.

The user interface type 214 can be provided by world class designers, custom designed, or automatically generated with the interface components 216. For example, the interface components 216 can be arranged by word class interface designers for limited or restricted distribution.

Figure 3:
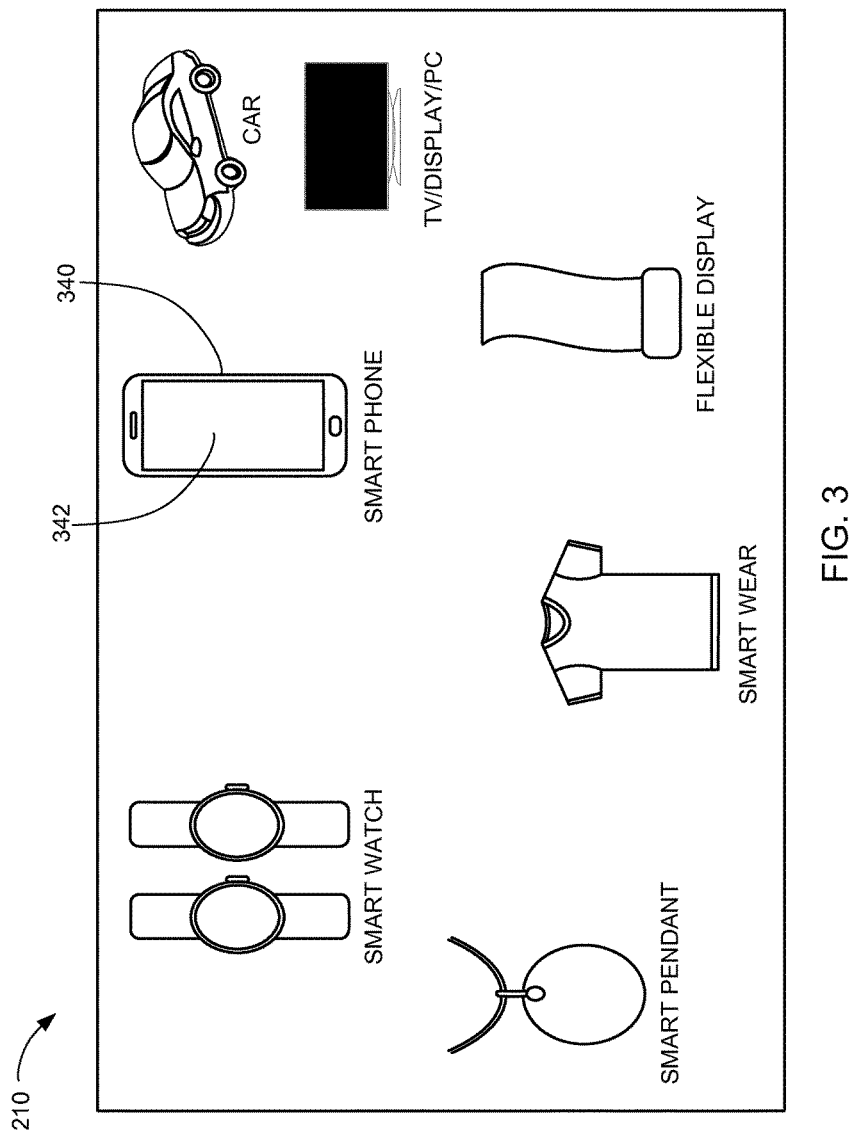
FIG. 3 is examples of the presentation device.

Referring now to FIG. 3, therein is shown examples of the presentation device 210. The first device 102 of FIG. 2 can be or include the presentation device 210 or an associated device 340. The associated device 340 is one or more instances of the presentation device 210, associated with the device user that is capable of presenting the presentation content 212 of FIG. 2. For example, the associated device 340 can be associated with the device user, such as through common ownership of the presentation device 210 and the associated device 340. As illustrated in FIG. 3, the associated device 340 can be a mobile phone, a watch, clothing, or jewelry, such as a pendent, each having audio, visual, haptic capabilities, or a combination thereof, a vehicle or vehicle display, a display device, such as a television or flexible display. The associated device 340 can present the presentation content 212.

The presentation device 210 and the associated device 340 can include device capability factors 342. The device capability factors 342 are the properties and capabilities for presenting the interface and content on the device. For example, the device capability factors 342 can include the display, audio, and haptic capabilities of the presentation device 210 and the associated device 340. In a further example, the device capability factors 342 can include contextual capability factors, such as battery life, the strength or availability of data connectivity, or the state of usage by the device user.

In yet another example, the device capability factors 342 can include the form factor of the presentation device 210 and the associated device 340. As a specific example, the form factor can be the shape or displayable area for the presentation device 210, such as a watch face or watch wristband having display capabilities or a shirt with image display capabilities.

The user interface type 214 of FIG. 2, the presentation content 212, or a combination thereof can be presented based on the device capability factors 342 of the presentation device 210 and the associated device 340. More specifically, the user interface type 214, the presentation content 212, or a combination thereof can be modified or presented differently for different types of the presentation device 210 or the associated device 340.

As a specific example, the user interface type 214 can be resized to fill or replace the matte boarder or frame, such as the black bars, that appear along the edges of a television screen or monitor to accommodate the aspect ratio of a movie format. Similarly, the presentation content 212 including an image or picture can be resized or patterned to fill or replace the matte boarder or frame that appear along the edges of a television screen or monitor.

In another specific example, for the presentation content 212 including an image, the electronic system 100 can adjust the image to fit the display capabilities of the associated device 340, such as a watch wrist band or watch face, that is different from that of the presentation device 210, such as a smart phone or tablet computer.

The electronic system 100 can synchronize the presentation content 212 between the presentation device 210 and the associated device 340. For example, synchronization of the presentation content 212 can occur when the electronic system 100 can transmit or deliver the presentation content 212 for presentation that is different on the associated device 340 relative to the presentation device 210, but complementary. The presentation content 212 can be complementary when the presentation device 210 and the associated device 340 are used to jointly present different components of the same instance the presentation content.

As a specific example, for the presentation content 212 having a deep sea or ocean theme, the electronic system 100 can synchronize the presentation device 210 and the associated device 340 based on the device capability factors 342. More specifically, in this example, the device capability factors 342 for the presentation device 210 can include only visual and audio capabilities, such as a display screen, and the device capability factors 342 for the associated device 340 can include primarily haptic capabilities, such as a smart clothes or a watch band having haptic capabilities. To continue the example, the presentation content 212 can be complementary by display deep sea images and sounds on the presentation device 210 and haptic feedback, such as a cool or wet sensation through the associated device 340.

Figure 4:
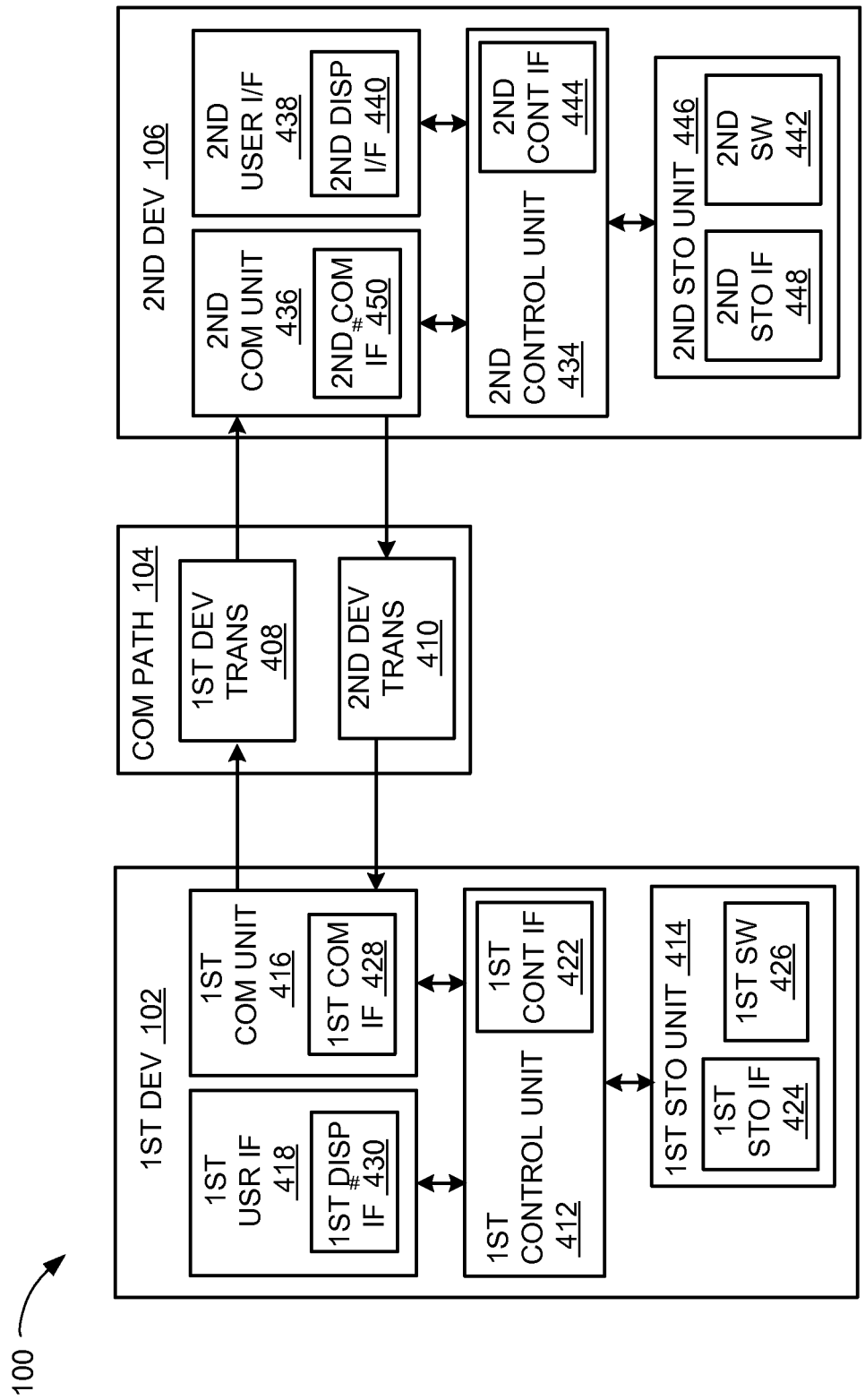
FIG. 4 an exemplary block diagram of the electronic system of FIG. 1.

Referring now to FIG. 4, therein is shown an exemplary block diagram of the electronic system 100. The electronic system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418. The first control unit 412 can include a first control interface 422. The first control unit 412 can execute a first software 426 to provide the intelligence of the electronic system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof. The first user interface 418 can include haptic capabilities, such as localized temperature control to provide different temperatures at different locations along the surface of the first device 102 or texture control to provide the sensation of different or changing textures along the surface of the first device 102.

The first control unit 412 can operate the first user interface 418 to display information generated by the electronic system 100. The first control unit 412 can also execute the first software 426 for the other functions of the electronic system 100. The first control unit 412 can further execute the first software 426 for interaction with the communication path 104 via the first communication unit 416.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the electronic system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the electronic system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the electronic system 100 is shown with the second storage unit 446 as a single hierarchy storage system, although it is understood that the electronic system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The electronic system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

Figure 5:
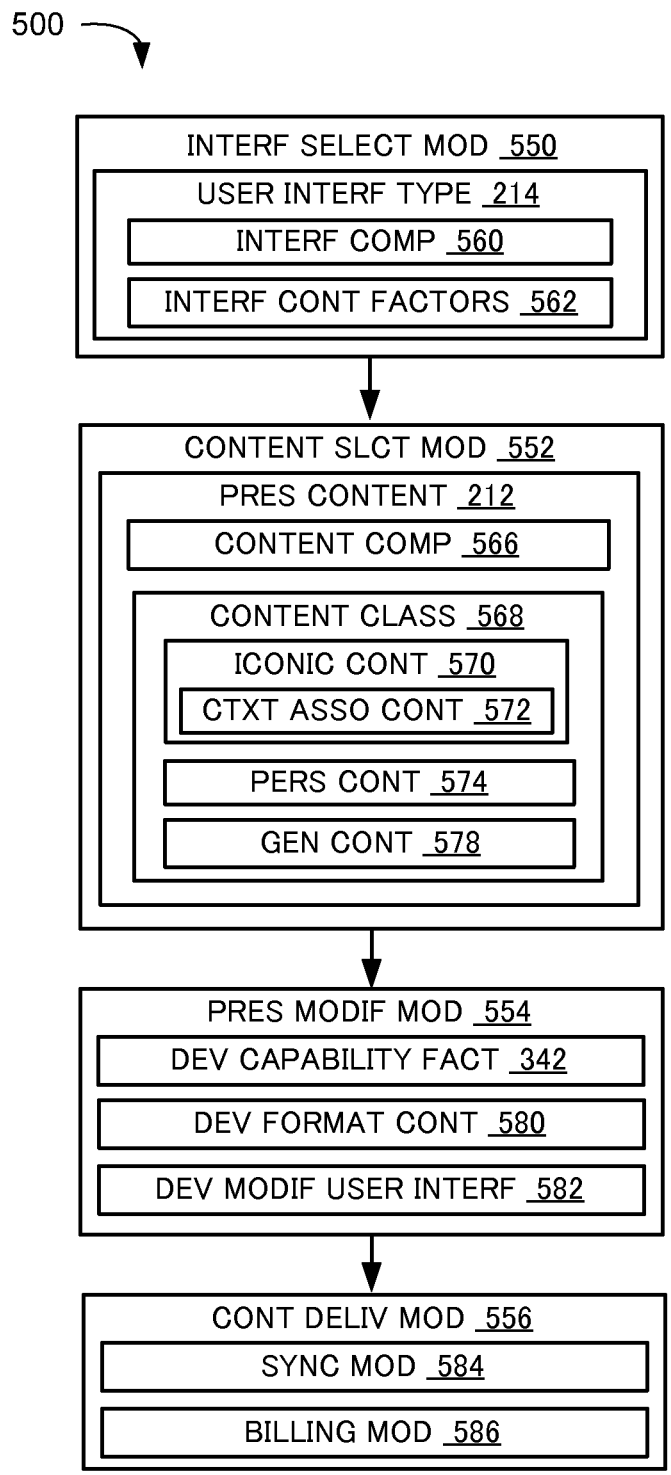
FIG. 5 is a control flow of the electronic system.

Referring now to FIG. 5, therein is shown a control flow 500 of the electronic system 100 of FIG. 1. The control flow 500 of the electronic system 100 can include an interface selection module 550, a content selection module 552, a presentation modification module 554, and a content delivery module 556. The interface selection module 550 can be coupled to the content selection module 552. The content selection module 552 can be coupled to the presentation modification module 554. The presentation modification module 554 can be coupled to the content delivery module 556.

The interface selection module 550 is for enabling selection of an interface for the device. For example, the interface selection module 550 can present one or more instances of the user interface type 214 for selection by the device user for presentation on the presentation device 210, the associated device 340 or a combination thereof. As a specific example, the interface selection module 550 can present instances of the user interface type 214, such as iconic interface types that include an interface type generated, provided by or designed by prestigious interface designers, a world-class or exclusive interface type, a limited availability interface type, or a content based interface type, which is an interface type based on the content selected by the device user. In another example, the interface selection module 550 can generate the user interface type 214 automatically or based on design specifications provided by interface designers.

The user interface type 214 can include interface components 216 and interface context factors 562. The interface components 216 are the components arranged to form the interface. For example, the interface components 216 can be the components that determine the layout of the user interface type 214. The interface components 216 can include the interface layers, interface platform icons, interface widgets, screen lock mechanisms, a device cover, or a combination thereof. As a specific example, the interface components 216 can include the top layer 218, the platform layer 220, and the bottom layer 222, all of FIG. 2. The interface selection module 550 can present the user interface type 214 generated, for example by the world class interface designers, based on the interface components 216 having a unique or specific design or arrangement.

The interface context factors 562 are the factors for modifying the interface based on the current circumstances associated with the device or user. The interface context factors 562 can include location context, time context, event context, or personal context. For example, the interface context factors 562 can be used to alter or modify the interface components 216 of the user interface type 214 based on the current circumstances, such as current or real time events, associated with the first device 102, the device user, or a combination thereof.

The interface components 216 and interface context factors 562 can be used to present the presentation content 212. For example, the interface selection module 550 can present the custom interface designs, the automatically generated interface designs, of default interface designs for selection by the device user.

The content selection module 552 is for providing content for presentation on the device. For example, the content selection module 552 can present the presentation content 212 for selection by the device user for presentation on the presentation device 210, the associated device 340 or a combination thereof. As a specific example, the content selection module 552 can present the presentation content 212 through an online store or online catalog for selection by the device user. In another example, the presentation content 212 can be provided by to the second device 106, the first device 102, including the presentation device 210, the associated device 340, or a combination thereof through the content selection module 552. As a specific example, the presentation content 212 can be provided by world class designers, online sources, the first storage unit 414 of FIG. 4, or the second storage unit 446 of FIG. 4.

The presentation content 212 can include content components 556. The content components 556 are the components of content that will be presented on the device. The content components 556 can include a visual component, an audio component, a haptic component, an interactive component, or a combination thereof.

The presentation content 212 can include content classifications 568, such as iconic content 570, personalized content 574, or general content 578. The iconic content 570 is exclusive, limited, or restricted access content for display on a device. For example, the iconic content 570 can be limited access or limited distribution content, such as through subscription service or one time purchase.

The iconic content 570 can be scientific, research related, of nature, space, cultural, such as sports related, historic, or traditional, from high speed or 360 degree view cameras, sounds or designs. The iconic content 570 can include context associated content 572. The context associated content 572 is the content generated based on the activities or location of the device user. For example, satellite images of the specific location at the time the device user performed an action, such as taking a picture at the location or checking into the location with the presentation device 210. The context associated content 572 can be updated based on further actions taken by the device user.

The content selection module 552 can receive the presentation content 212 for the iconic content 570 from iconic content providers. The iconic content providers can be specialized content creators, research organizations, such as NASA or other government organizations, National Geographic, Discovery, commercial providers and designers.

The personalized content 574 is content associated with the user. For example, the personalized content 574 can be content generated by the device user, such as images, videos, or sounds.

The general content 578 is content that is available to the general public. For example, the general content can be unrestricted content from the internet.

The content selection module 552 can present the presentation content 212 in association with the user interface type 214. For example, the content selection module 552 can present the iconic content 570 on an instance of the user interface type 214 that is currently on the presentation device 210 or other instances of the user interface type 214 that have not been selected by the device user.

The presentation modification module 554 is for determining the capabilities of the device and modifying the interface, the content or a combination for presentation on the device. The presentation modification module 554 can modify or format the presentation content 212, including the iconic content 570, the user interface type 214, or a combination thereof for presentation on the presentation device 210, the associated device 340, or a combination thereof. The presentation modification module 554 can generate a device formatted content 580 from the presentation content 212 based on the device capability factors 342. The device formatted content 580 is content that has been modified or formatted to conform to the capabilities of a device. Similarly, the presentation modification module 554 can generate a device modified user interface 582 from the user interface type 214 based on the device capability factors 342. The device modified user interface 582 is a user interface that has been formatted or modified to conform to the capabilities of a device. These functions will be discussed in greater detail below.

The content delivery module 556 is for delivering selected interface and content for presentation on one or more devices. For example, the content delivery module 556 can deliver the device formatted content 580, the device modified user interface 582, or a combination thereof to the presentation device 210, the associated device 340, or a combination thereof. As a specific example, the presentation content 212, the user interface type 214, or a combination thereof can be stored on the second storage unit 446 of the second device 106, both of FIG. 4. To continue the specific example, content delivery module 556 can deliver the selected instances of the presentation content 212, the user interface type 214, or a combination thereof through the communication path 104 for presentation on the first device 102, including the presentation device 210, the associated device 340 or a combination thereof.

In another example, the content delivery module 556 can deliver the device formatted content 580, the device modified user interface 582, or a combination thereof between elements or components of the first device 102. For example, the device formatted content 580, the device modified user interface 582, or a combination thereof can be delivered from the first storage unit 414 of FIG. 4 to the first user interface 418 for presentation on the presentation device 210.

The content delivery module 556 can include a synchronization module 584. The synchronization module 584 is for providing the user interface, the content, or a combination thereof to other devices for simultaneous or synchronized presentation. The synchronization module 584 can provide the device formatted content 580, the device modified user interface 582, or a combination thereof for synchronized presentation between the presentation device 210 and the associated device 340.

For example, the synchronization module 584 can provide the device formatted content 580 that has been formatted or modified differently based on the device capability factors 342 of the presentation device 210 and the associated device 340 for complementary presentation. As a specific example, for the device formatted content 580 based on iconic content 570 having a deep sea or ocean theme, the synchronization module 584 can provide the device formatted content 580 to the presentation device 210 having only visual and audio components and provide the device formatted content 580 to the associated device 340 having only haptic feedback.

In another example, the content delivery module 556 can deliver the device formatted content 580, the device modified user interface 582, or a combination thereof between the presentation device 210 and the associated device 340 for synchronized presentation. For example, when the device formatted content 580 or the device modified user interface 582 is generated on the presentation device 210, the content delivery module 556 can deliver the device formatted content 580 or the device modified user interface 582 to the associated device 340.

The content delivery module 556 can include a billing module 586, coupled to the synchronization module 584. The billing module 586 is for invoicing or billing the user of the device for the user interface, the content, or a combination thereof. For example, the billing module 586 can charge the device user a fee when the device user selects the user interface type 214, the presentation content 212, or a combination thereof for presentation on the presentation device 210.

It has been discovered that the electronic system 100 provides improved integration between the presentation device 210 and the associated device 340 for presentation of the device formatted content 580. The device formatted content 580 can be formatted or modified differently based on the device capability factors 342 of the presentation device 210 and the associated device 340 for complementary presentation of the device formatted content 580 which provides improved integration between the presentation device 210 and the associated device 340.

The electronic system 100 has been described with module functions or order as an example. For example, the first software 426 of FIG. 4 of the first device 102 of FIG. 4 can include the modules for the electronic system 100. As a specific example, the first software 426 can include the interface selection module 550, the content selection module 552, the presentation modification module 554, the content delivery module 556, and the synchronization module 584.

The first control unit 412 of FIG. 4 can execute the first software 426 for the interface selection module 550 for generating or enabling selection of the user interface type 214 and the content selection module 552 for receiving or selection of the presentation content 212 that is provided to the first device 102. The first control unit 412 can execute the first software 426 for the presentation modification module 554 to generate the device formatted content 580 and the device modified user interface 582. The first control unit 412 can operate the first storage interface 324 for delivery of the device formatted content 580 and the device modified user interface 582 to the first user interface 418 of FIG. 4.

The second software 442 of FIG. 4 of the second device 106 of FIG. 4 can include the modules for the electronic system 100. For example, the second software 442 can include the interface selection module 550, the content selection module 552, the presentation modification module 554, the content delivery module 556, and the synchronization module 584.

The second control unit 434 of FIG. 4 can execute the second software 442 for the interface selection module 550 for selection of the user interface type 214 and the content selection module 552 for receiving or selection of the presentation content 212 that is provided to the second device 106. The second control unit 434 can execute the second software 442 for the presentation modification module 554 to generate the device formatted content 580 and the device modified user interface 582. The second control unit 434 can operate the second communication unit 436 for delivery of the device formatted content 580 and the device modified user interface 582.

The modules of the electronic system 100 can be partitioned between the first software 426 and the second software 442. For example, the second software 442 can include interface selection module 550, the content selection module 552, the content delivery module 556, and the synchronization module 584. The second control unit 434 can execute modules partitioned on the second software 442 as previously described. To continue the example, the first software 426 can include the presentation modification module 554. Based on the size of the first storage unit 414 of FIG. 4, the first software 426 can include additional modules of the electronic system 100. The first control unit 412 can execute the modules partitioned on the first software 426 as previously described.

The first control unit 412 can operate the first user interface 418 to present device formatted content 580 and the device modified user interface 582. The first control unit 412 can operate the first software 426 to operate the first user interface 418.

The electronic system 100 can partition the modules differently or order the modules differently. For example, the content selection module 552 can come before the interface selection module 550, or the content selection module 552 and the interface selection module 550 can be combined. Each of the modules can operate individually and independently of the other modules. Furthermore, data generated in one module can be used by another module without being directly coupled to each other.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

The physical transformation from presenting the presentation content 212, including the context associated content 572 of the iconic content 570, results in the movement in the physical world, such as device users selecting the context associated content 572 for presentation on the presentation device 210. Movement in the physical world, such as actions taken by the device user at a location, results in changes to the context associated content 572, such as updating the context associated content 572 in response to the actions taken by the device user.

The control flow 500 can be a method 500 of operation of the electronic system 100 that includes: providing an iconic content; generating a user interface type for the iconic content; generating a device formatted content from the iconic content for conforming to a device capability factor of a presentation device; and delivering the device formatted content for presentation with the user interface type on the presentation device.

Figure 6:
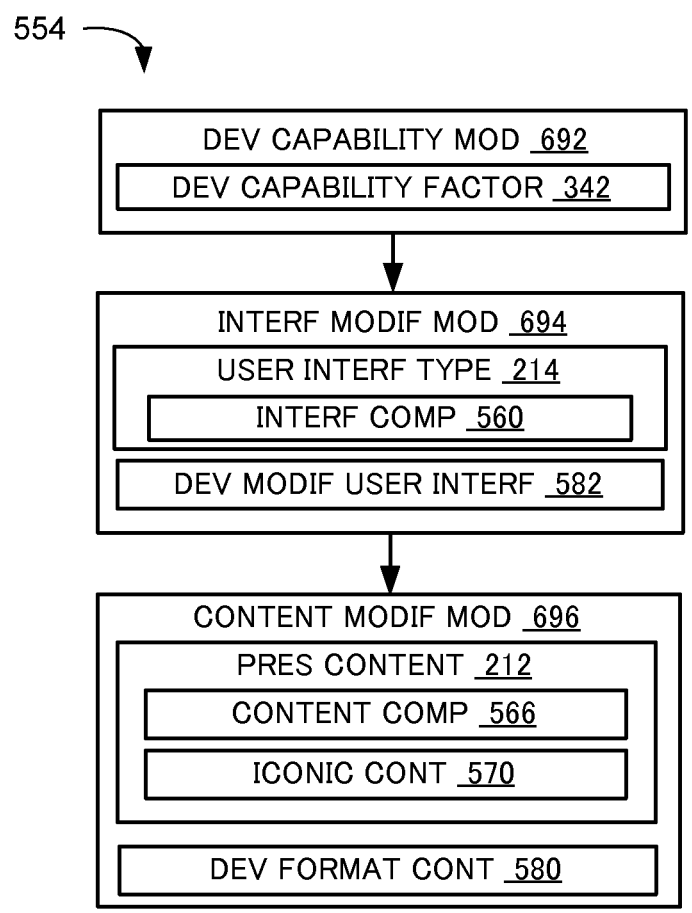
FIG. 6 is a view of the presentation modification module.

Referring now to FIG. 6, therein is shown view of the presentation modification module 554. The presentation modification module 554 can include a device capability module, an interface modification module 694, and a content modification module 696.

The device capability module 692 is for determining the presentation capabilities of the device. The device capability module 692 can determine the device capability factors 342 for the presentation device 210, the associated device 340, or a combination thereof. For example, the device capability module 692 can check the hardware specifications of the presentation device 210, the associated device 340, or a combination thereof to determine which of the device capability factors 342 are available. As a specific example, the device capability module 692 can determine that the presentation device 210 of a smart phone can include the device capability factors 342 of audio capability, video capability, but not haptic capability through the display interface.

In another example, the device capability module 692 can determine the device capability factors 342 based on contextual capability factors, such as battery life, the strength or availability of data connectivity, or the state of usage by the device user. As a specific example, the device capability module 692 can determine the state of usage factor of the device capability factors 342 as inactive when the electronic system 100 of FIG. 1 determines that presentation device 210 is in a purse or backpack of the device user.

The interface modification module 694 is for modifying the user interface based on the capabilities of the device. The interface modification module 694 can generate the device modified user interface 582 based on the device capability factors 342. For example the interface modification module 694 can modify the arrangement the interface components 216 to conform to the device capability factors 342 of the first device 102. As a specific example, the interface modification module 694 can generate the device modified user interface 582 by adding, removing, resizing, or repositioning portions of the layout component of the interface components 216 to correspond or accommodate the display interface size or resolution of the device capability factors 342. In another specific example, the interface modification module 694 can resized to fill or replace the matte boarder or frame, such as the black bars, that appear along the edges of a television screen or monitor with the interface components 216, such as areas to display images, to generate the device modified user interface 582.

In another example, the interface modification module 694 can generate the device modified user interface 582 by modifying the implementation of the interface components 216 to conform to the device capability factors 342. As a specific example, the interface modification module 694 can adjust, change, augment, or remove certain functionality of the user interface components 216 based on the availability of the device capability factors 342, such as removing the lock screen or widget components when presenting the device modified user interface 582 on smart clothes or a television.

In yet another example, the interface modification module 694 can generate the device modified user interface 582 to augment applications or functionality for specific aspects of the device capability factors 342 with the device modified user interface 582. As a specific example, the interface modification module 694 can generate the device modified user interface 582 to integrate with the web browsing application or capability of the device capability factors 342. For instance, the device modified user interface 582 can be generated to change the layout of a web page to incorporate interface components 216 of the user interface type 214, such as adding areas to display the presentation content 212.

The content modification module 696 is for modify the content to conform to the capabilities of the device. The content modification module 696 can generate the device formatted content 580 from the presentation content 212 based on the device capability factors 342, the user interface type 214, the device modified user interface 582, or a combination thereof. For example, the content modification module 696 can generate the device formatted content 580 by removing or modify the content components 556 of the iconic content 570 that can correspond to the device capability factors 342 that are missing or not present on to presentation device 210 or the associated device 340.

In another example, the content modification module 696 can generate the device formatted content 580, including the iconic content 570, differently to conform to the device capability factors 342 of different instances of the presentation device 210 or the associated device 340. In a specific example, the device formatted content 580 can be generated to include only visual or audio components for the presentation device 210 or the associated device 340 having only the audio and visual capabilities of the device capability factors 342. In another specific example, the device formatted content 580 can be generated to include only haptic or visual components for the presentation device 210 or the associated device 340 having only the haptic and visual capabilities of the device capability factors 342.

In yet another example, the content modification module 696 can generate the device formatted content 580 from the presentation content 212 based on the user interface type 214 or the device modified user interface 582. For example, the content modification module 696 can generate the device formatted content 580 to correspond with or conform to the interface components 216 of the user interface type 214 or the device modified user interface 582. As a specific example, the content modification module 696 can generate the device formatted content 580 by cropping or resizing the visual portion for the content components 556 of the presentation content 212 to correspond with or conform to the layout component of the interface components 216 for the user interface type 214 or the device modified user interface 582. In another specific example, the device formatted content 580 can be generated by extracting a freeze frame or single frame of a video portion for the content components 556 of the presentation content 212 as an image for presentation by the user interface type 214 or the device modified user interface 582.

It has been discovered that the electronic system 100 provides improved presentation of the presentation content 212, including the iconic content 570, on the presentation device 210, the associated device 340, or a combination thereof by generating the device formatted content 580. The device formatted content 580 can be generated to correspond with, confirm to, or match the device capability factors 342 of the presentation device 210, the associated device 340, or a combination thereof to improve presentation of the presentation content 212.

It has further been discovered that the electronic system 100 provides improved presentation of the user interface type 214 on the presentation device 210, the associated device 340, or a combination thereof by generating the device modified user interface 582. The device modified user interface 582 can be generated to correspond with, conform to, or match the device capability factors 342 of the presentation device 210, the associated device 340, or a combination thereof to improve presentation of the user interface type 214.

Figure 7:
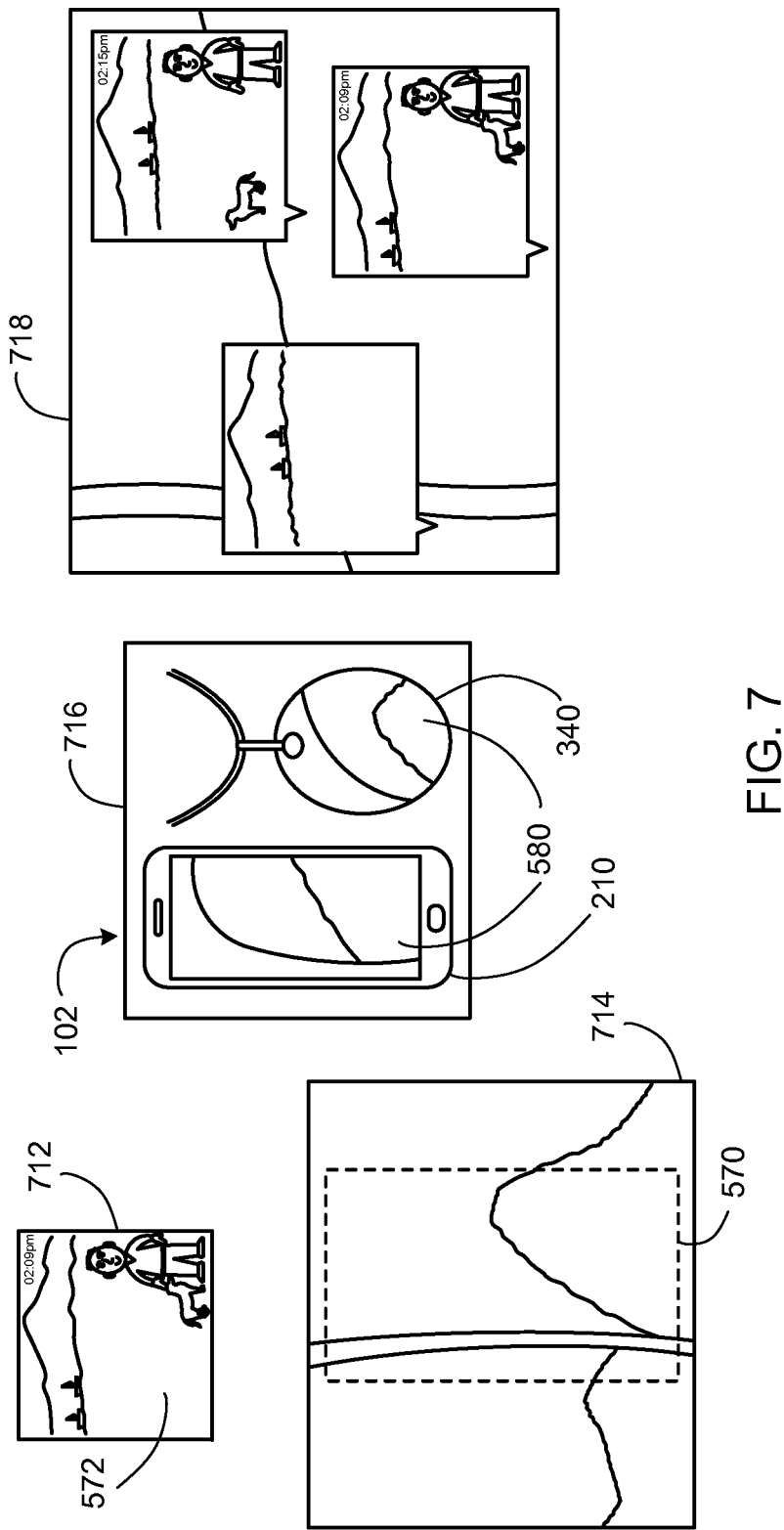
FIG. 7 is the presentation of the iconic content on the first device of FIG. 1.

Referring now to FIG. 7, therein is shown the presentation of the iconic content 570 on the first device 102 of FIG. 1. The iconic content 570 can include the context associated content 572. In this example, the context associated content 572 can be based on actions of the device user at a location, such as taking a picture at in the mountains, as illustrated in a first panel 712 of FIG. 7. The electronic system 100 can generate the context associated content 572, with the content selection module 552 of FIG. 5, as a satellite picture of location the device user at the moment the action of the device user occurred, as illustrated in a second panel 714 of FIG. 4.

To continue the example, the electronic system 100 can provide the context associated content 572, with the content delivery module 556 of FIG. 5, to the presentation device 210 and the associated device 340 as the device formatted content 580. In this example, as illustrated in a third panel 716, the presentation device 210 can be the smart phone and the associated device 340 can be smart jewelry, such as a smart pendant having display and haptic capabilities.

The user interface type 214 of FIG. 2 can be modified, with the presentation modification module 554 of FIG. 5, to generate the device modified user interface 582 of FIG. 5 that corresponds, matches, or accommodates the device capability factors 342 of FIG. 3 for the presentation device 210, the associated device 340, or a combination thereof. In this example, the device modified user interface 582 can be different for the associated device 340 and the presentation device 210. For instance, the display portion of the user interface type 214 can be modified differently to generate the device modified user interface 582 that corresponds with, conforms to, or matches the display area of the associated device 340 and the presentation device 210.

The context associated content 572 can be modified, with the presentation modification module 554 of FIG. 5, to generate the device formatted content 580 that corresponds, matches, or accommodates the device capability factors 342 of the presentation device 210, the associated device 340, or a combination thereof. In this example, the content components 556 of the context associated content 572 can include the visual component, the audio component, and the haptic component. To continue the example, the content components 556 of the context associated content 572 can be modified differently based on the device capability factors 342 of the presentation device 210 and the associated device 340 to generate the device formatted content 580.

For instance, the visual component of the content components 556 can be cropped or resized differently to match, conforms to, or corresponds with the display area of the associated device 340 and the presentation device 210. In another instance, the haptic component of the content components 556 can be included with the associated device 340 having the haptic capability of device capability factors 342, but can be excluded for the presentation device 210, which may not have the haptic capability. In yet another instance, the audio component of the content components 556 can be included with the presentation device 210 having the audio capability of the device capability factors 342, but can be excluded from the associated device 340, which may not have the audio capability.

The iconic content 570 can include interactive content, as illustrated in a fourth panel 718. For example, the context associated content 572 in this example can include information related to the satellite image of the device user. As a specific example, the device user can interact with the satellite image to learn more about the locations captured in the satellite image.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a control unit, including a processor, configured to:
provide an iconic content;
generate a user interface type for the iconic content;
generate a device formatted content from the iconic content for conforming with a device capability factor, including a form factor, of a wearable presentation device, wherein:
the device capability factors are capabilities for presenting the device formatted content on the presentation device, including haptic feedback for providing physical sensations; and
the device formatted content is synchronized between an associated device and the wearable presentation device;
generate a device modified user interface from the user interface type based on modifying interface components of the user interface type; and a communication unit, coupled to the control unit, configured to deliver the device formatted content for presentation with the user interface type on the presentation device.

2. The system as claimed in claim 1 wherein the control unit is configured to generate a device modified user interface based on the user interface type for conforming to the device capability factor of the wearable presentation device.

3. The system as claimed in claim 1 wherein the control unit is configured to generate the further instance of the device formatted content as complimentary to the presentation content of the wearable presentation device.

4. The system as claimed in claim 1 wherein the control unit is configured to provide a context associated content.

5. The system as claimed in claim 1 wherein the control unit is configured to generate the device modified user interface by adding, removing, resizing, or repositioning portions of the layout component of the interface components.

6. The system as claimed in claim 1 wherein the control unit is configured to generate the device formatted content including removing or modifying one or more content components of the iconic content.

7. The system as claimed in claim 1 wherein the control unit is configured to provide the iconic content having content components including a visual component, an audio component, a haptic component, or a combination thereof.

8. A method of operation of an electronic system comprising:
providing an iconic content;
generating a user interface type for the iconic content;
generating a device formatted content from the iconic content for conforming to a device capability factor, including a form factor, of a wearable presentation device, wherein:
the device capability factors are capabilities for presenting the device formatted content on the presentation device, including haptic feedback for providing physical sensations; and
the device formatted content is synchronized between an associated device and the wearable presentation device;
generating a device modified user interface from the user interface type based on modifying interface components of the user interface type; and
delivering the device formatted content for presentation with the user interface type on the presentation device.

9. The method as claimed in claim 8 further comprising generating a device modified user interface based on the user interface type for conforming to the device capability factor of the wearable presentation device.

10. The method as claimed in claim 8 wherein generating the further instance of the device formatted content includes generating the further instance of the device formatted content as complimentary to the presentation content of the wearable presentation device.

11. The method as claimed in claim 8 wherein providing the iconic content includes providing context associated content.

12. The method as claimed in claim 8 wherein generating the device modified user interface includes adding, removing, resizing, or repositioning portions of the layout component of the interface components.

13. The method as claimed in claim 8 wherein generating the device formatted content includes removing or modifying one or more content components of the iconic content.

14. The method as claimed in claim 8 wherein providing the iconic content includes providing the iconic content having content components including a visual component, an audio component, a haptic component, or a combination thereof.

15. A non-transitory computer readable medium including instructions for operating an electronic system comprising:
providing an iconic content;

generating a user interface type for the iconic content;

generating a device formatted content from the iconic content for conforming to a device capability factor, including a form factor, of a wearable presentation device, wherein:

the device capability factors are capabilities for presenting the device formatted content on the presentation device, including haptic feedback for providing physical sensations; and the device formatted content is synchronized between an associated device and the wearable presentation device;

generating a device modified user interface from the user interface type based on modifying interface components of the user interface type; and delivering the device formatted content for presentation with the user interface type on the presentation device.

16. The non-transitory computer readable medium system as claimed in claim 15 further comprising generating a device modified user interface based on the user interface type for conforming to the wearable device capability factor of the presentation device.

17. The non-transitory computer readable medium as claimed in claim 15 wherein generating the further instance of the device formatted content includes generating the further instance of the device formatted content as complimentary to the presentation content of the wearable presentation device.

18. The non-transitory computer readable medium as claimed in claim 15 wherein providing the iconic content includes providing context associated content.

19. The non-transitory computer readable medium as claimed in claim 15 wherein generating the device modified user interface includes adding, removing, resizing, or repositioning portions of the layout component of the interface components.

20. The non-transitory computer readable medium as claimed in claim 15 wherein generating the device formatted content includes removing or modifying one or more content components of the iconic content.

* * * * *